(12) United States Patent
Yang

(10) Patent No.: US 7,513,472 B2
(45) Date of Patent: Apr. 7, 2009

(54) ADJUSTABLE STAND

(75) Inventor: Shang-Wen Yang, No. 199, Chung-Cheng Road, Hsichih City, Taipei Hsien (TW)

(73) Assignee: Shang-Wen Yang, Taipei Hsien (TW)

( * ) Notice: Subject to any disclaimer, the term of this patent is extended or adjusted under 35 U.S.C. 154(b) by 41 days.

(21) Appl. No.: 11/775,233

(22) Filed: Jul. 10, 2007

(65) Prior Publication Data

US 2009/0014608 A1      Jan. 15, 2009

(51) Int. Cl.
*A47B 96/06* (2006.01)
*A47F 1/10* (2006.01)

(52) U.S. Cl. .............................. 248/231.81; 248/309.1; 248/316.1; 224/197; 24/3.11

(58) Field of Classification Search ................. 248/393, 248/394, 395, 676, 920, 923, 311.2, 309.1, 248/231.81, 238.11, 316.1, 154, 127, 372.1, 248/411, 128; 24/11, 339, 3.11, 3.12, 3.7, 24/338; 224/197, 930, 269
See application file for complete search history.

(56) References Cited

U.S. PATENT DOCUMENTS

| 2,219,091 | A | * | 10/1940 | Henderson | 248/452 |
|---|---|---|---|---|---|
| 4,175,306 | A | * | 11/1979 | Bigelow et al. | 24/507 |
| 5,765,820 | A | * | 6/1998 | Marusiak | 269/6 |
| 5,797,578 | A | * | 8/1998 | Graffeo et al. | 248/453 |
| 5,988,577 | A | * | 11/1999 | Phillips et al. | 248/231.81 |
| 6,208,734 | B1 | * | 3/2001 | Ortscheid et al. | 379/446 |
| 6,752,299 | B2 | * | 6/2004 | Shetler et al. | 224/197 |
| 7,168,672 | B2 | * | 1/2007 | Hsu | 248/444 |
| 7,219,869 | B1 | * | 5/2007 | Whittington | 248/311.2 |

* cited by examiner

*Primary Examiner*—Amy J. Sterling
*Assistant Examiner*—Tan Le

(57) ABSTRACT

An adjustable stand for carrying an electronic device and adjusting a position on a desk is provided to include a clamp and a supporting element. The clamp has a positioning element that comprises two axial portions each having a through hole, a clamping element that comprises an adjusting portion with a plurality of notches, and an elastic element positioned between the positioning element and the clamping element for restoring the position. The supporting element has two terminal rods that are axially fixed to the axial portions of the positioning element, and a supporting rod formed between the two terminal rods for lodging into one of the notches of the clamping element.

8 Claims, 7 Drawing Sheets

ADJUSTABLE STAND

BACKGROUND OF THE INVENTION

1. Field of the invention

The present invention relates to an adjustable stand, more particularly, the present invention relates to an adjustable stand for carrying an electronic device and adjusting a position on a desk.

2. Description of Related Art

Along with the rapid development of technology, mobile phone has become the most widely used products. Almost everybody has at least one mobile phone, and the mobile phones have increased year by year. Accordingly, there are many varieties of mobile phones available on the market having smaller size, light, and weight, and easy to carry, as well as with better software and hardware. The mobile phones comprising functions of camera, video communication, Wi-Fi/WLan wireless Internet, MP3 player, multimedia and games are available for satisfying different needs of the users.

While the user is traveling and needs to contact with other people, mobile phone is very important, and therefore the user usually carries the mobile phone. Therefore, there are mobile phone cases available on the market for place the mobile phone in the case and clamping the case onto the user's belt to offer convenience to the user for carrying the mobile phone. The user need not worry the mobile phone being misplaced or scratched when it falls down. However, the conventional mobile phone case can't be positioned upright on the desk after being removed from the belt despite the above advantages, and the mobile phone case can be either positioned flat or held in the hands for operation without the choice of the best angle. Thus, it is really inconvenient for the user for processing the video communication or operating the multimedia and games. Not only inconvenient but also the hand, wrist, neck, and the like of the user would be painful due to stress and fatigue. If the users purchase the stand for holding the mobile phone, it will not only be expensive, but also the stand is not convenient for carriage. In other words, the stand for holding the mobile phone is not practical.

Thus, designing an adjustable stand for carrying and positioning a device at a best angle for viewing is a key to overcome the conventional defects.

SUMMARY OF THE INVENTION

Accordingly, in the view of the foregoing, the present invention provides an adjustable stand.

According to an aspect of the present invention, the adjustable stand comprises a clamp that can be assembled by a positioning element, a clamping element and an elastic element axially positioned between the positioning element and the clamping element. The positioning element comprises two axial portions each having a through hole, and the clamping element comprises an adjusting portion with a plurality of notches, thus enabling the supporting element positioned in the through holes of the axial portions to support against the clamping element for opening at a proper angle, and a supporting rod of the supporting element is lodged into one of the notches of the clamping element. The plurality of notches formed on the adjusting portion allow the user to adjust the width of opening of the clamping element, and two slots on the lateral sides of the axial portions thereby could limit the maximum rotation angle of the supporting element.

According to another aspect of the present invention, the positioning element is further assembled with a case to retain a distance to the clamping element, and the user can adjust the distance according to the need to position the case upright on a desk for viewing a display on the electronic device positioned in the case at a best viewing angle. The user may process the live video communication, the multimedia and games via the display and plurality of keys on the electronic device. Thus, the user may not feel pain even after a long time use. Besides, the case positioned in the adjustable stand can serve as a stand for photo shooting as well. Thus, the user can easily carry it without a need to buy any additional stand.

According to another aspect of the present invention, the positioning element is assembled with a case to retain a distance to the clamping element, and the user can adjust according to the need to position the adjustable stand with the case upright on a desk. A clamping portion positioned on a side of the clamping element can be supported against the desk with the bottom portion of the case, and jointing portions of the positioning element and receiving portions of the clamping element form a stable triangular structure. Meanwhile, stopped blocks on the outer side of the clamping portion may function to protect the device from damage due to impact or shock due to external force and thereby substantially increase the overall stability.

DETAIL DESCRIPTION OF THE INVENTION

Figure 1:
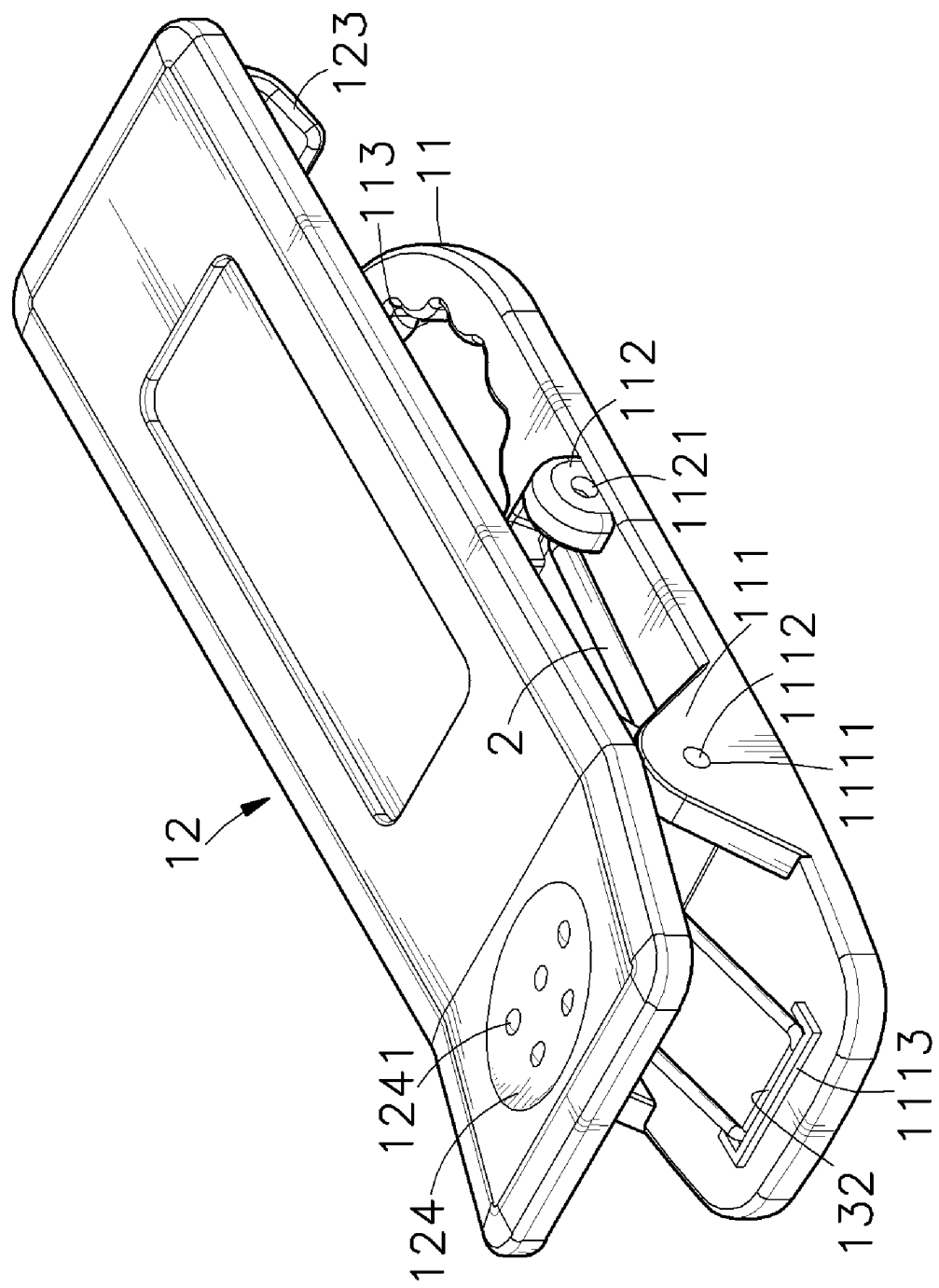
FIG. 1 is an elevational view of an adjustable stand according to an embodiment of the present invention.
Figure 2:
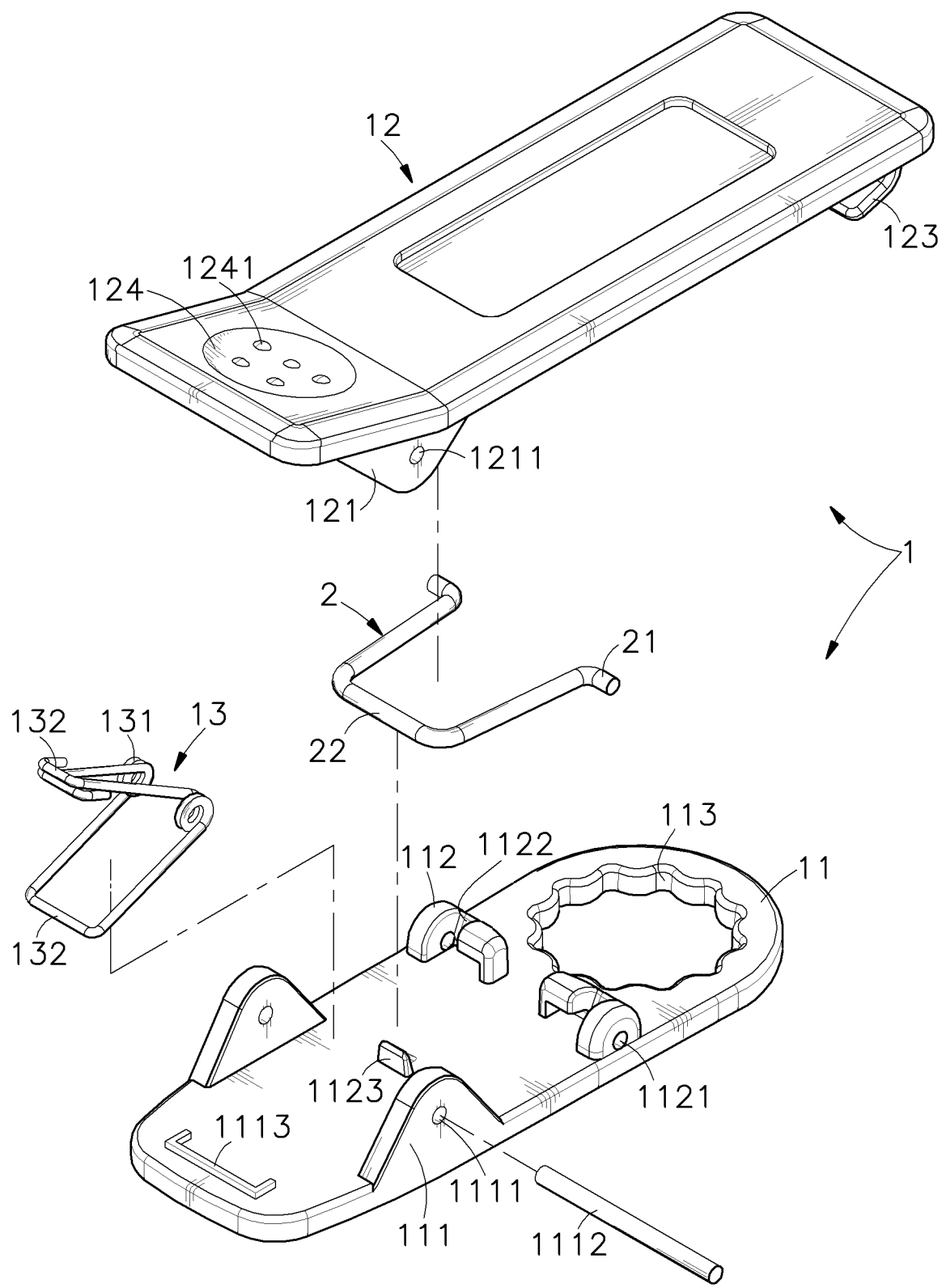
FIG. 2 is an exploded view of the adjustable stand according to an embodiment of the present invention.

Referring to FIGS. 1 and 2, an adjustable stand of the present invention is shown comprised of a clamp 1 and a supporting element 2. The clamp 1 comprises a positioning element 11 and a clamping element 12, and an elastic element 13 is axially positioned between the positioning element 11 and the clamping element 12.

The positioning element 11 comprises two protruded jointing portions 111 at two opposite sides near the frontal portion thereof. Each jointing portion 111 comprises a through hole 1111 for positioning an axle 1112, and a stopper 1113 is formed on the frontal portion of the positioning element 11. Two axial portions 112 are formed at two opposite sides near the rear portion of the positioning element 11, and each axial portion 112 comprises a through hole 1121 and a slot 1122 at a lateral side. A positioning plate 1123 is formed between the jointing portions 111 and the axial portions 112 and closes to the jointing portions 111, and the rear portion of the positioning element 11 comprises a positioning hole 113 forming a star shape.

The clamp element 12 comprises a declining pressing portion 124 and two receiving portions 121 protruding downwardly at two opposite sides from the pressing portion 124, and each receiving portion 121 has a receiving hole 1211. A stopper 1212 is positioned between the two receiving portions 121 at the frontal portion of the clamp element 12, and an adjusting portion 122 is formed on a side of the receiving portions 121. The adjusting portion 122 comprises a plurality of notches 1221. A clamping portion 123 that is bent downwardly is formed on the rear portion of the clamping element 12, and an outer side of the clamping portion 123 comprises a plurality of stopped blocks 1231 arranged in an array. Furthermore, the pressing portion 124 comprises a plurality of protrusions 1241.

The elastic element 13 is a folded spring with two holes 131, and a V shape holding portion 132 extends from two sides of each hole 131.

The supporting element 2 is a U shape and comprises two terminal rods 21 on the two free ends respectively. A supporting rod 22 is positioned between two terminal rods 21.

Hereinafter, assembly of the above elements is described. First, the positioning element 11 and the clamping element 12 are correspondingly positioned to make the receiving holes 1211 on the receiving portions 121 of the clamping element 12 aim at the through holes 1111 on the jointing portions 111 of the positioning element 11, and the elastic element 13 between the positioning element 11 and the clamping element 12 is axially fixed to make the holes 131 of the elastic element 13 position corresponding to the through holes 1111 and the receiving holes 1211, and the axle 1112 is fitted into the through holes 1111, the receiving holes 1211 and the holes 131. Next, the holding portions 132 of the elastic element 13 are buckled against the stopper 1113 of the positioning element 11 and the stopper 1212 of the clamping element 12 respectively to prevent the elastic element 13 from the positioning element 11 and the clamping element 12. Furthermore, the supporting element 2 can movably axially positioned on the axial portions 112 of the positioning element 11 by fitting the terminal rod into the through holes 1121 of the axial portion 112. At the same time, the inner side of the supporting rod 22 of the supporting element 2 is against the positioning plate 1123 on the positioning element 11 to limit the movement of the supporting element 2. Thus, the assembly of the adjustable stand according to an embodiment of the present invention is complete, which has a more stable structure and higher reliability.

Alternatively, the clamping element 12 may comprise axial portions 112 for fitting the supporting element 2, and the positioning element 11 may comprise a adjusting portion 122 with a plurality of notches 1221. Furthermore, the stopped block 1231 of the clamping portion 123 may be comprised of silicon, rubber or other suitable resilient materials, and the surface of the clamping portion 123 further is covered with silicon, rubber or other suitable resilient materials to provide buffering effect to protect the clamping portion 123. The above description is intended to merely demonstrate an embodiment of the present invention; any alteration or modification thereof to achieve the above purpose shall be construed to be within the scope of the present invention.

Figure 3:
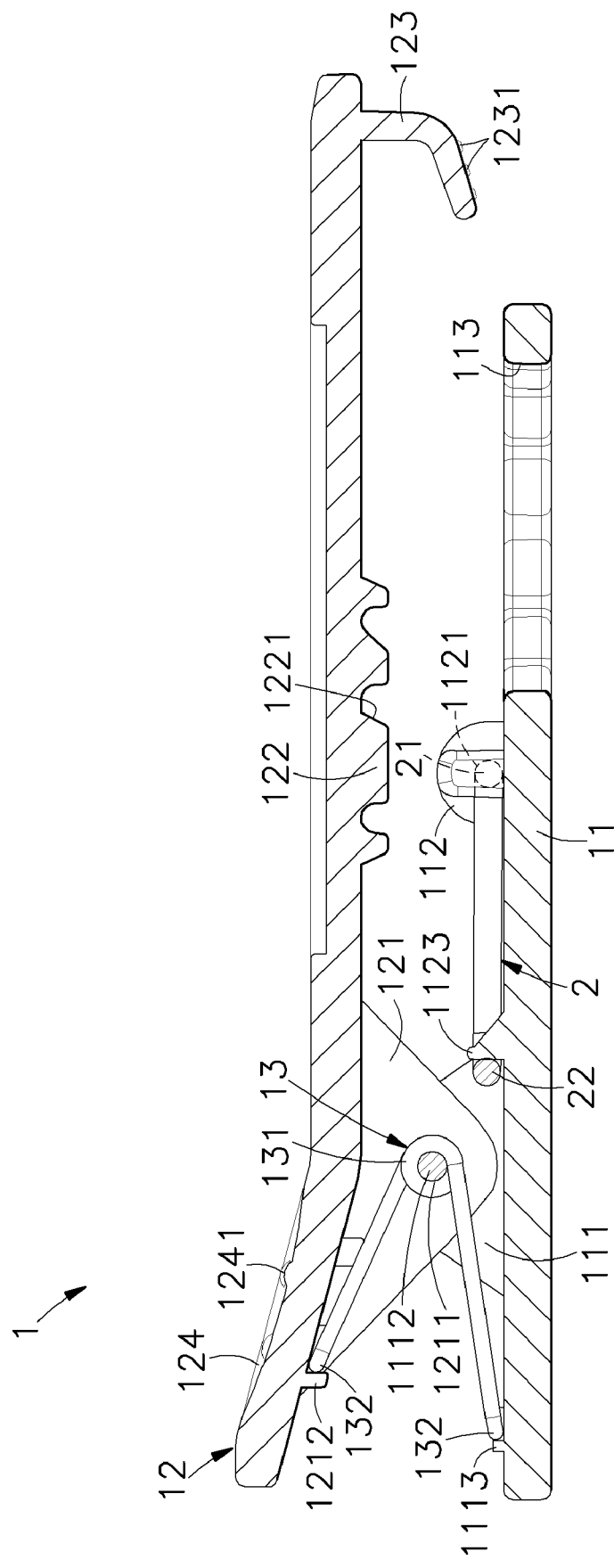
FIG. 3 is a sectional side view of the adjustable stand before adjusting according to an embodiment of the present invention.
Figure 4:
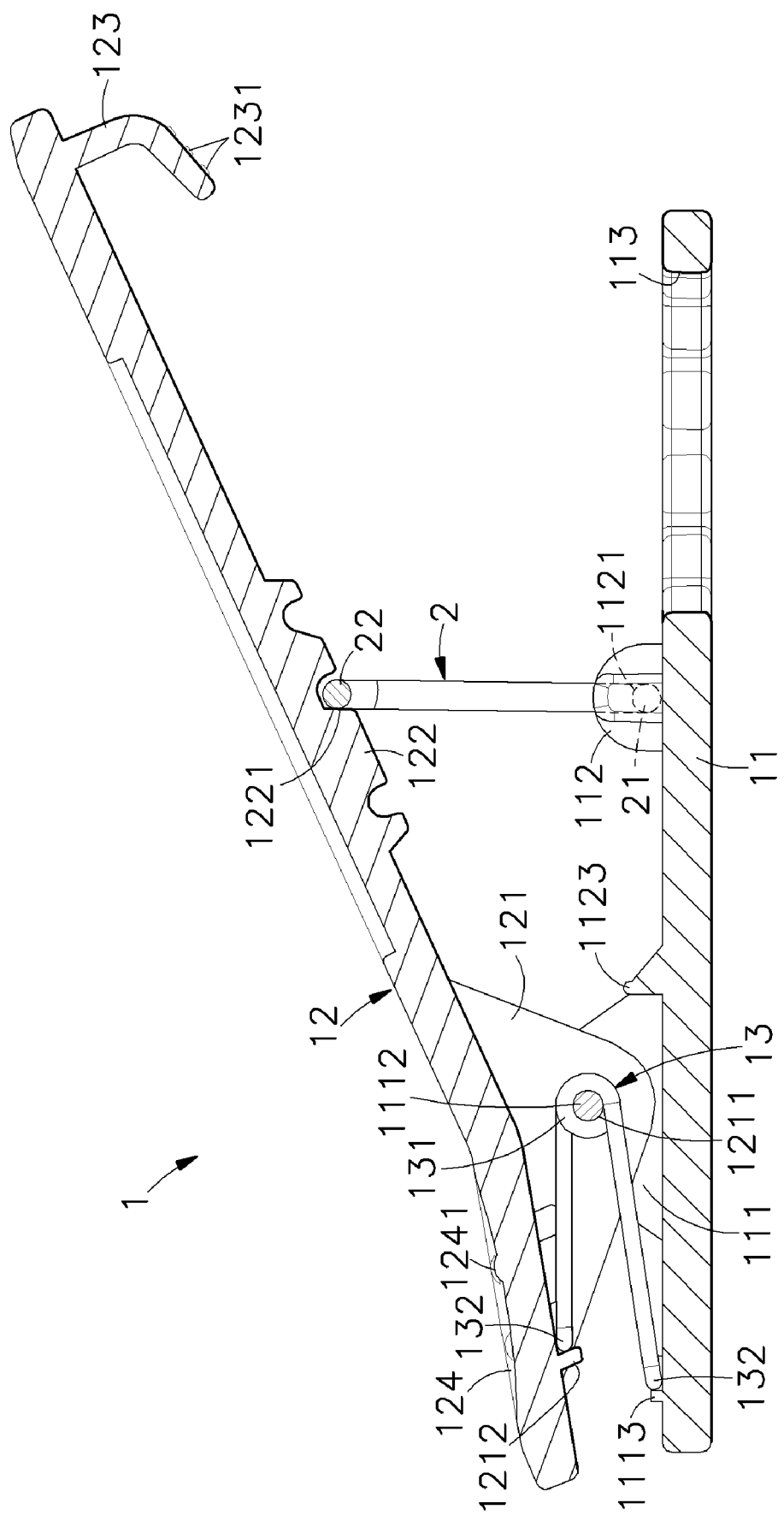
FIG. 4 is a sectional side view of the adjustable stand after adjusting according to an embodiment of the present invention.

Referring to FIGS. 3 and 4, to adjust the adjustable stand of the present invention, the pressing portion 124 of the clamping element 12 is pressed, and the protrusions 1241 on the pressing portion 24 can prevent the clamping element 12 from slipping off, then the clamping element 12 is moved upwardly relative to the positioning element 11 along the axle 1112. Meanwhile, the elastic element 13 between the positioning element 11 and the clamping element 12 is forced to deform the holding portions 132 of the elastic element 13 inwardly; thereby the clamping element 12 can be opened at a proper angle. Furthermore, the supporting element 2 axially connected to the axial portions 112 of the positioning element 11 is released from the positioning plate 1123. The supporting element 2 is axially moved along the two terminal rods 21, and the supporting rod 22 of the supporting element 2 supports against the adjusting portion 122 of the clamping element 12, and therefore a user can adjust the clamping element 12 to open to a desired range by lodging the supporting rod 22 into one of the plurality of notches 1221 of the adjusting portion 122. At the same time, the largest rotation angle of the supporting element 2 may be limited by the slots 1122 of the axial portions 112.

Hereinafter, the restoration of the adjustable stand according to an embodiment of the present invention is described. The pressing portion 124 of the clamping element 12 is pressed to release the supporting element 2 from the adjusting portion 122 of the clamping element 12, and the supporting element 2 moves along the terminal rods 21 and the supporting rod 22 is supported against the positioning plate 1123 of the positioning element 11. Thus, the movement of the supporting element 2 is limited to enable the clamping element 12 rotate towards the positioning element 11 along the jointing portions 111 by the elasticity of the elastic element 13 to close the space between the positioning element 11 and the clamping element 12.

Figure 5:
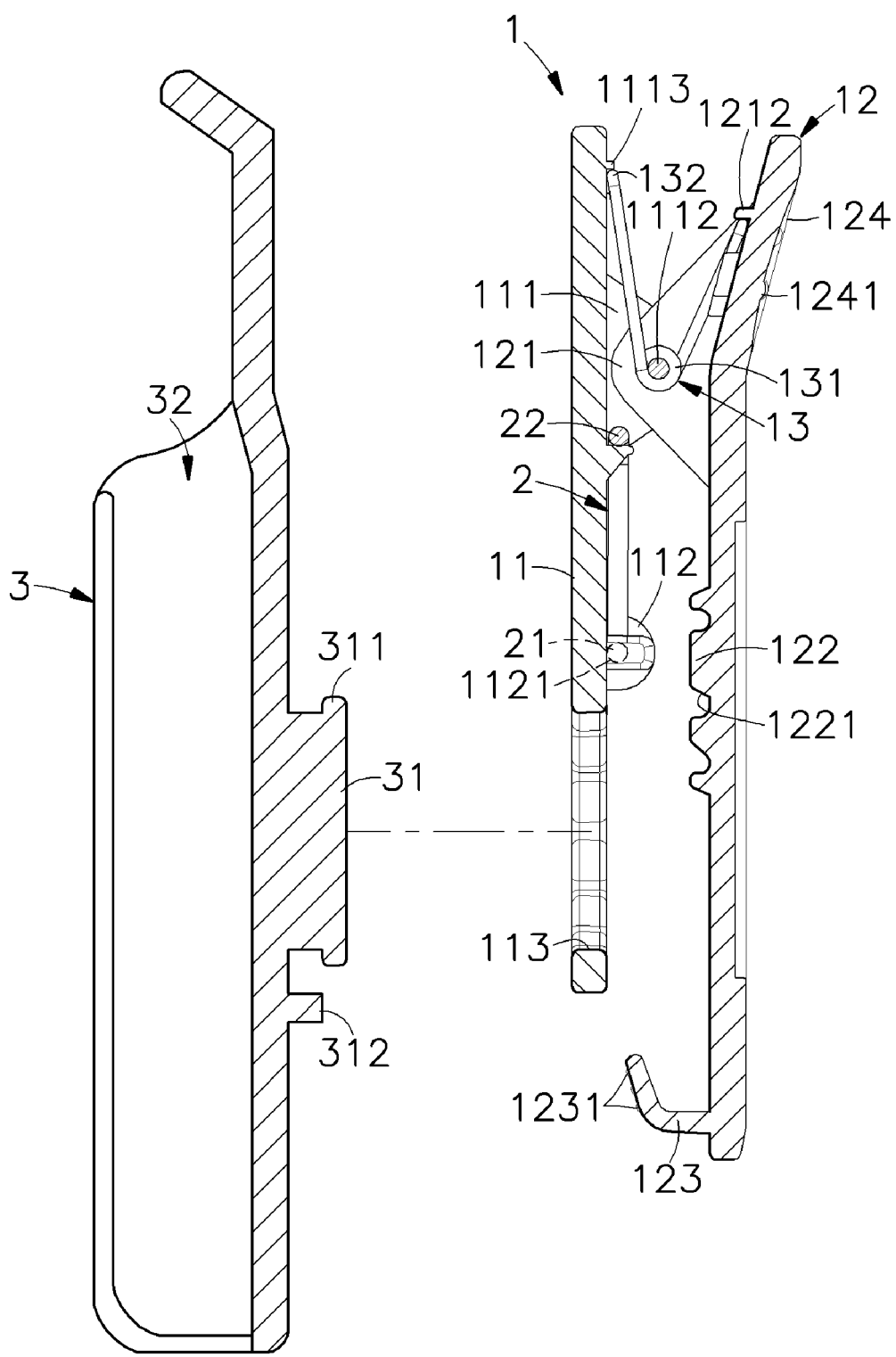
FIG. 5 is a sectional side view of the adjustable stand before positioning the case according to a preferred embodiment of the present invention.
Figure 6:
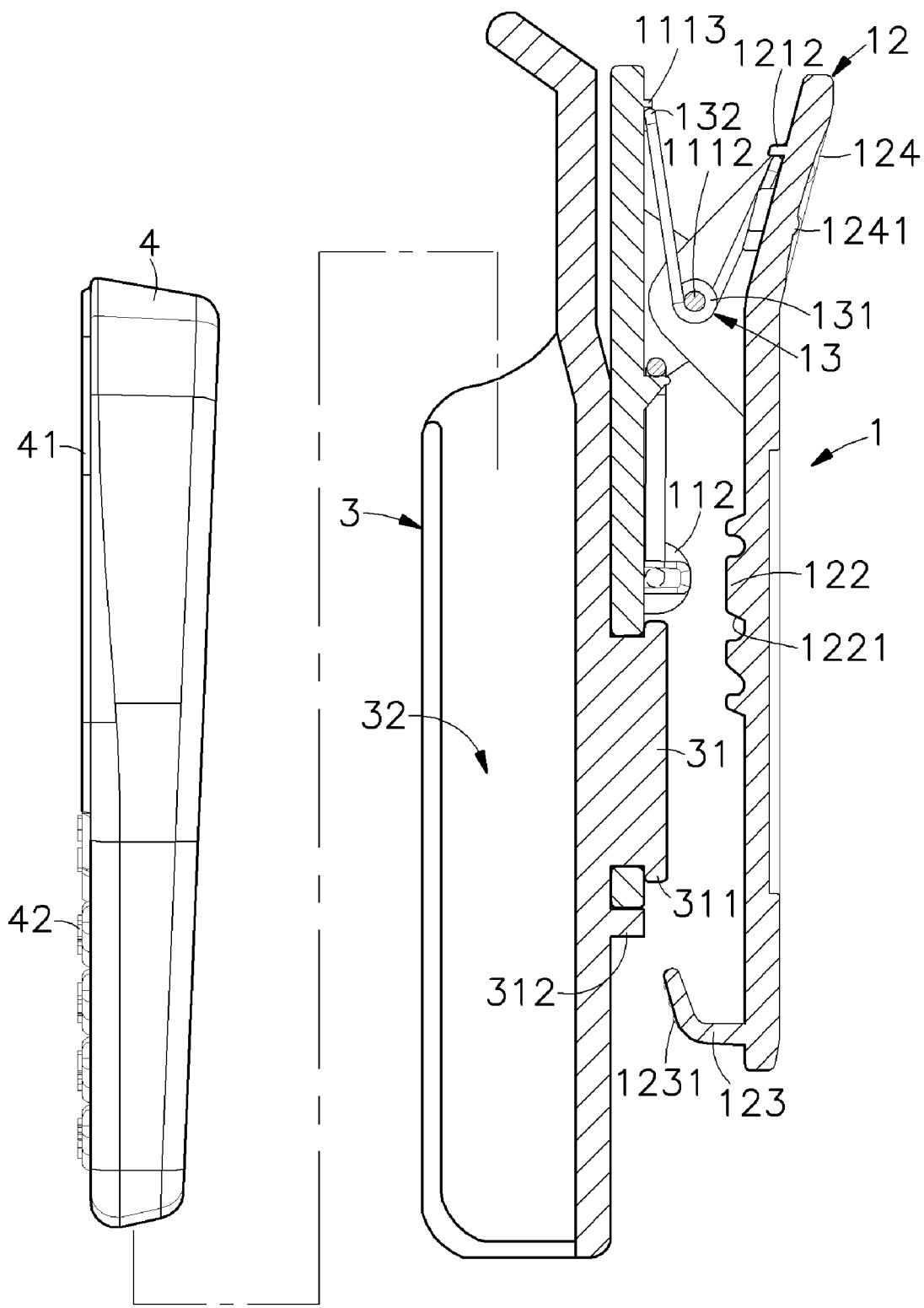
FIG. 6 is a sectional side view of the adjustable stand with the case before positioning the electronic device according to a preferred embodiment of the present invention.
Figure 7:
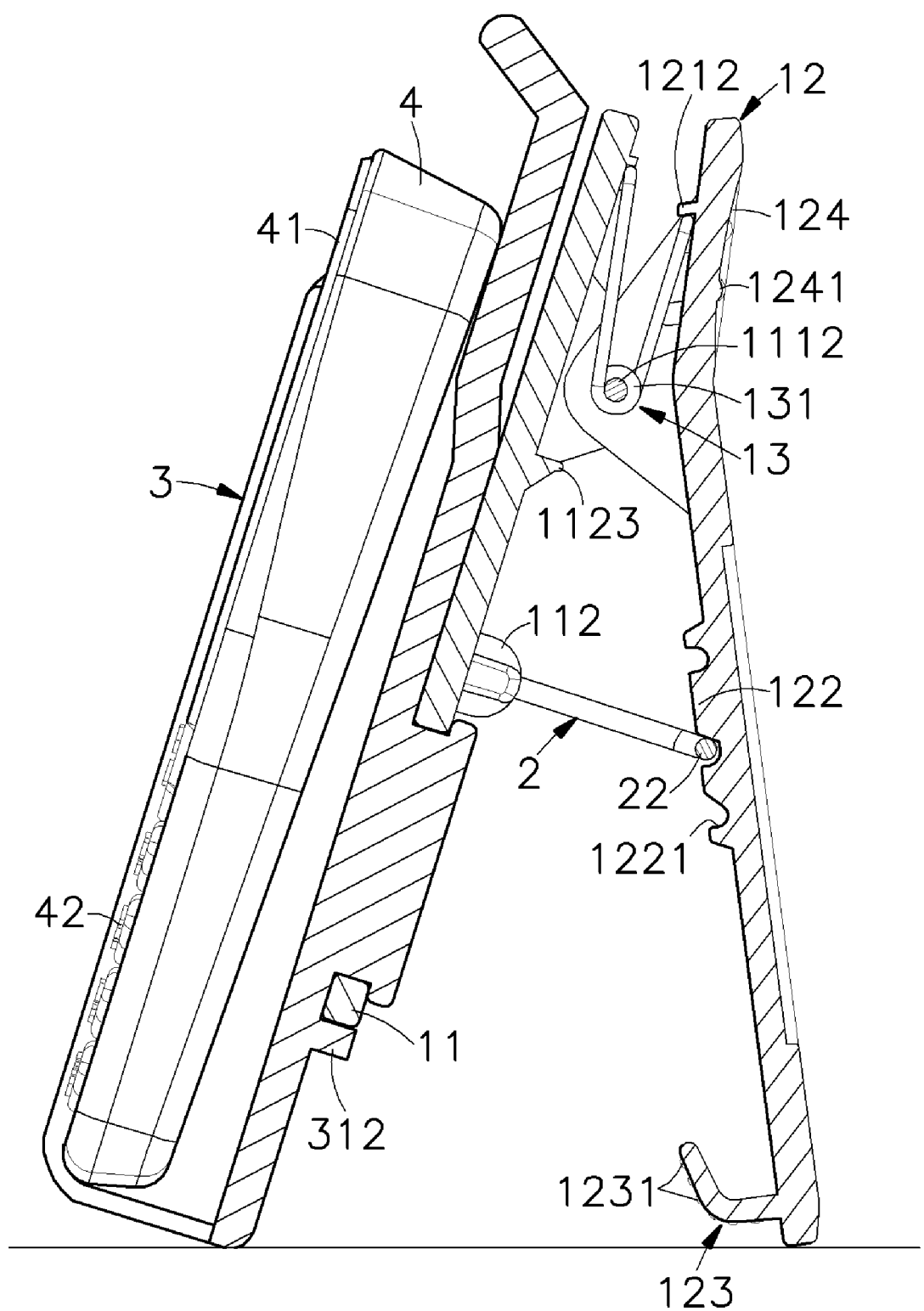
FIG. 7 is a sectional side view of the adjustable stand after adjusting according to a preferred embodiment of the present invention.

Referring to FIGS. 5, 6 and 7, the positioning element 11 further comprises a case 3 having an embedding portion 31 and a receiving space 32 for storing an electronic device 4. The embedding portion 31 comprises a plurality of buckles 311 positioned around thereof, and a limiting block 312 is positioned adjacent to one buckle 311. The electronic device 4 may be a mobile phone, a palm game player, a PDA, a MP3 player or a portable video device.

To assemble the above elements, the embedding portion 31 of the case is inserted into the positioning hole 113 of the positioning element 11 to enable the buckles 311 around the embedding portion 31 fit in and project out of the positioning hole 113. Meanwhile, the outer flange of the positioning hole 113 is positioned between the embedding portion 31 and the limiting block 312. The arched face of the positioning element 11 at the rear portion enables the case 3 to rotate to a proper angle. Thus, the buckles 311 of the case 3 are respectively embedded and alternately arranged into the positioning hole 113. Furthermore, the electronic device 4 can be placed into the receiving space 32 of the case 3, and the user may operate the electronic device 4 by pressing keys 42 and view an image on a display 41.

When using the adjustable stand according to an embodiment of the present invention, the pressing portion 124 of the clamping portion 12 may be pressed to make the clamping element 12 rotates along the receiving portion 121, and the elastic element 13 is forced to deform inwardly between the positioning element 11 and the clamping element 12 to open the clamping element 12 in a proper angle. Then, the user can make the supporting rod 22 of the supporting element 2 lodge into one of the notches 1221 of the adjusting portion 122 of the clamping element 12 to open the clamping element 12 from the positioning element 11, thus the adjustable stand of the present invention can be positioned upright on a desk. At this time, the clamping portion 123 of the clamping element 12 and the bottom portion of the case 3 are positioned on the desk, and the jointing portions 111 of the positioning element 11 and the receiving portions 121 of the clamping element 12 form a triangular structure with more stability. Besides, the stopped blocks 1231 on the outer side of the clamping portion 123 can function as a buffer for protecting the electronic device 4 from impact or quake due to external force to substantially increase the overall stability.

The supporting element 2 rotates in the through holes 1121 of the axial portions 112 along the terminal rods 21 to make the supporting rod 22 of the supporting element 2 lodge to one of the notches 1221 of the adjusting portion 122, and the notches 1221 enables the clamping element 12 to open to a proper angle relative to the positioning element 11. Thus, the case 3 positioned on the positioning element 11 keeps at a distance from the clamping element 12, and the user can adjust according to the need to place the case 3 upright on a desk to view the display 41 of the electronic device 4 positioned in the case 3 at a best viewing angle. Thus, the user can process the live video communication, multimedia and games on the display 4 by pressing the plurality of keys 42 on the electronic device 4. Therefore, the user will not experience any stress or fatigue even after a long time usage. Besides, the adjustable stand of the present can also serve as a stand for photo shooting. Thus, the user can easily carry it without needing to carry an additional stand and avoid additional cost.

The adjustable stand of the present invention has at least the following advantages.

1. The supporting rod 22 of the supporting element 2 is lodge in one of the plurality of notches 1221 of the adjusting portion 122 to enable the clamping element 12 to open in a proper angle relative to the positioning element 11.

2. The clamping portion 123 of the clamping element 12 and the bottom portion of the case 3 are positioned on the desk, and the jointing portions 111 of the positioning element 11 and the receiving portions 121 of the clamping element 121 form a triangular structure so that the adjustable stand can be more stably positioned on the desk.

3. The case 11 positioned on the positioning element 1 is maintained at a distance from the clamping element 12 for allowing the user to adjust the distance according to the actual need to place the case 3 upright on the desk to view the display 41 of the electronic device 4 within the case 3 with a best viewing angle.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What the invention claimed is:

1. An adjustable stand, suitable for carrying an electronic device and adjusting a position on a desk, comprising:
a clamp, comprising a positioning clement, a clamping element and an elastic element positioned between said positioning element and said clamping element, wherein said positioning element comprises two axial portions each having a through hole, and said clamping element comprises an adjusting portion having a plurality of notches corresponding to said axial portions, wherein said positioning element comprises two jointing portions at two opposite sides thereof, and each said jointing portion comprises a through hole for fitting an axle, and a stopper is positioned at a side near said jointing portions; and
a supporting element, axially fixed to said axial portions of said positioning element, comprising two terminal rods formed on free sides thereof for fitting into said through holes of said axial portions, and a supporting rod formed between said terminal rods for lodging into one of said notches of said clamping element.

2. The adjustable stand according to claim 1, wherein said clamping element comprises two axial portions each having a through hole for jointing movably with a supporting element, and said positioning element comprises a adjusting portion having a plurality of notches.

3. The adjustable stand according to claim 1, wherein said axial portions each comprises a slot at a lateral side, and a positioning plate is formed on a side adjacent to said jointing portions and a positioning hole is formed on another side thereof apart from said jointing portion.

4. The adjustable stand according to claim 1, wherein said clamping element comprises two receiving portions at two opposite sides, and each said receiving portion comprises a receiving hole corresponding to said through holes of said jointing portions of said positioning element, and a stopper is positioned between said two receiving portions, and a clamping portion is formed on a side apart from said receiving portions, and a declining pressing portion in formed on another side above said receiving portions.

5. The adjustable stand according to claim 4, wherein said clamping portion comprises a plurality of stopped blocks formed on an outer side thereof, and wherein said a material of stopped blocks and said clamping portion is covered from a group consisting of silicon, rubber or resilient materials to provide buffering effect; said pressing portion comprises a plurality of protrusions.

6. The adjustable stand according to claim 1, wherein said elastic element is a folded spring having two holes, and two V shaped holding portions are extended from two sides of said boles respectively.

7. The adjustable stand according to claim 1, wherein said positioning element is assembled with a case, and wherein said case comprises an embedding portion having a plurality of buckles at a flange, and a limiting block is positioned adjacent to one of said buckles, and a receiving space apart from said embedding portion comprises is used for storing said electronic device.

8. The adjustable stand according to claim 1, wherein said electronic device comprises a mobile phone, a palm game player, a PDA, a MP3 player or a portable video device.

* * * * *